INVENTORS
B. W. Winship and
W. T. Harder.
BY
R. S. A. Dougherty
ATTORNEY

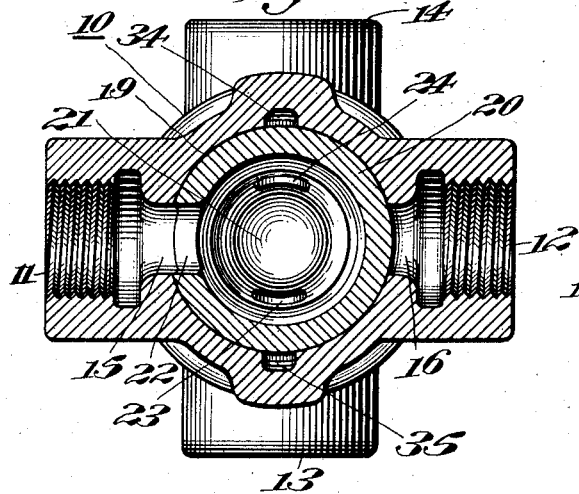
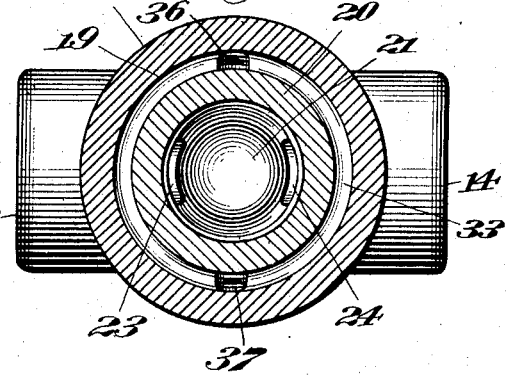
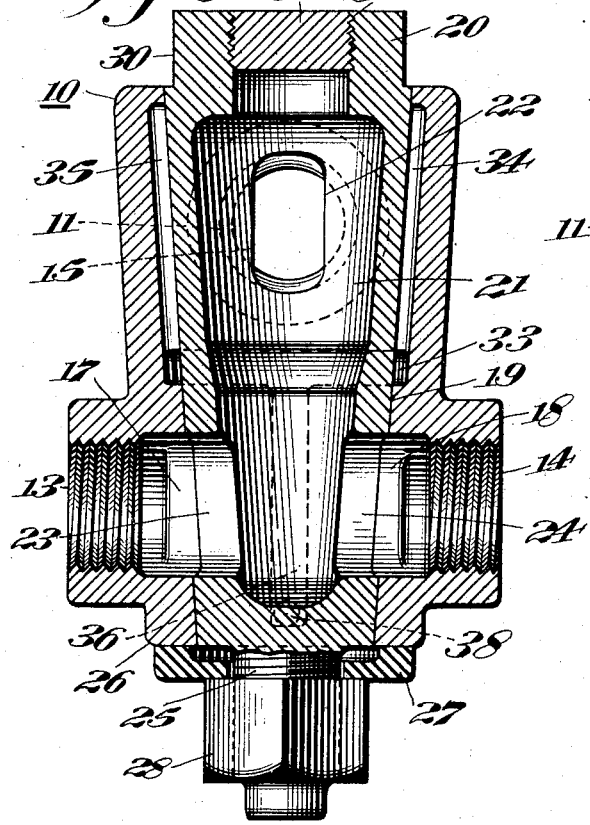
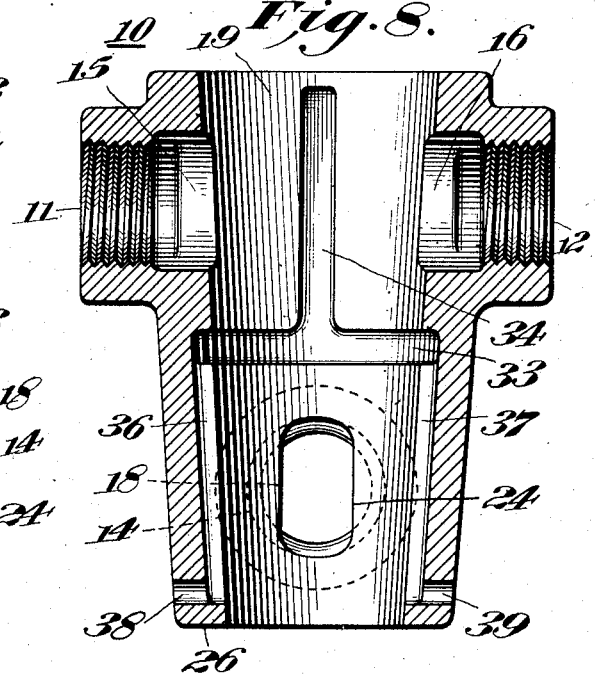

Patented Aug. 25, 1931

1,820,587

UNITED STATES PATENT OFFICE

BENJAMIN W. WINSHIP AND WILLIAM T. HARDER, OF STEELTON, PENNSYLVANIA, ASSIGNORS TO BETHLEHEM STEEL COMPANY

VALVE

Application filed December 12, 1927. Serial No. 239,274.

Our invention relates to new and useful improvements in valve structures.

It should be understod that many industrial mills have several sources of water supply to meet their requirements. For instance, under normal operating conditions the water supplied for certain uses may be untreated river water or other water unfit for drinking purposes and it is often necessary in cases of emergency to connect the mill water system with an outside supply, which may be filtered and suitable for drinking purposes. Heretofore, it has been customary, in such cases, to use in the system a double shut off valve with a bleeder between to prevent the possibility of contaminating the drinking water with the impure water of the plant system.

It is the object of our invention to provide a simple compact valve structure adapted to control a water system of the above character and having means incorporated therein to eliminate entirely the possibility of the mill water contaminating the drinking water.

Another object of our invention is to provide a novel form of valve, cheaply and easily manufactured, containing a minimum number of parts, adapted to be inserted in a fluid supply system to constitute a common control device for controlling the flow of fluids having different properties from several sources of fluid supply to a common line having its parts so arranged that, when the valve is set for the passage of fluid from one of said sources to said common line, it is assured that leakage from the other of said supplies will not mingle with the fluid flowing through said line.

Figure 1:
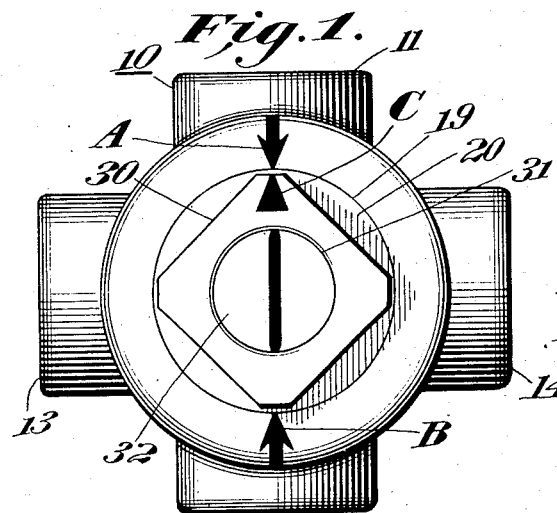
Figure 3:
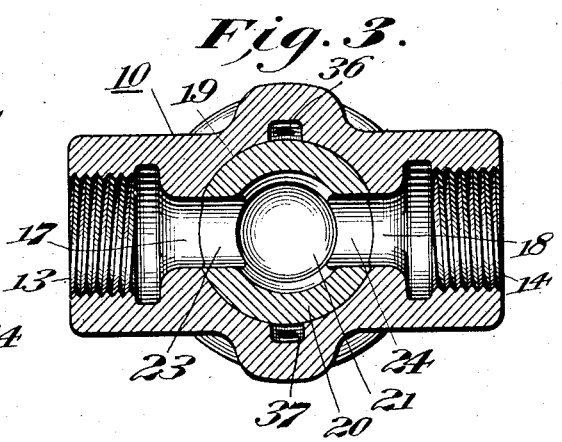
Figure 2:
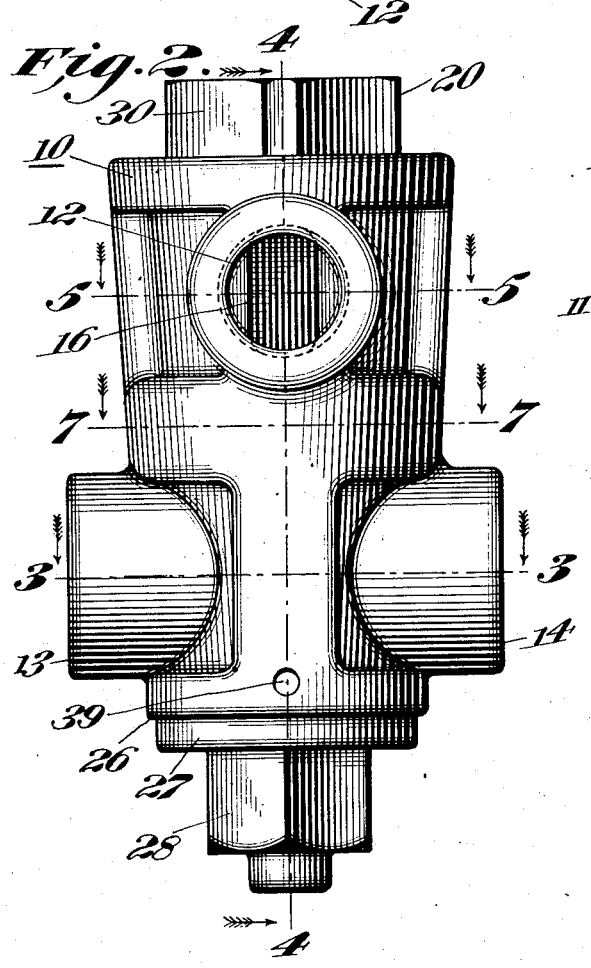
Figure 4:
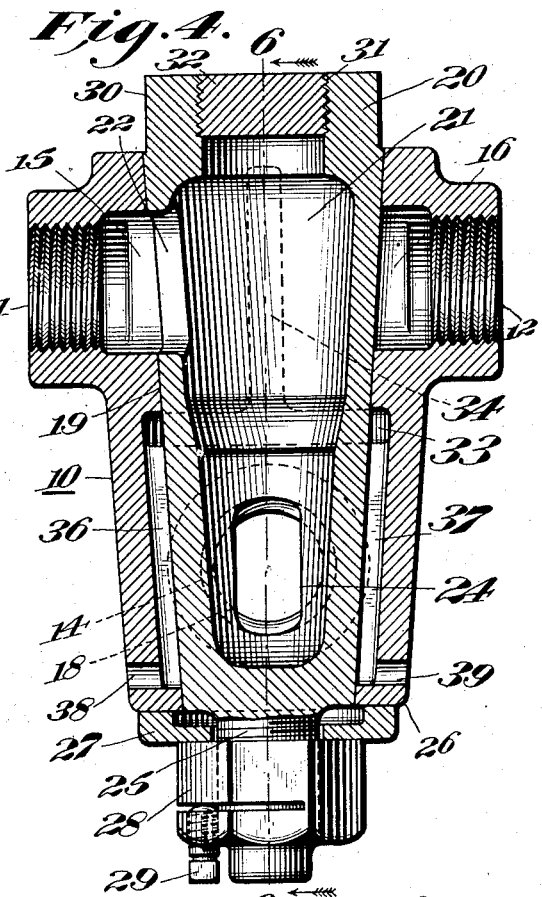

The novel features of our invention will be more fully understood from the following description and claims taken with the accompanying drawings in which:

Fig. 1 is a top view of the valve;
Fig. 2 is a side elevation of the valve;
Fig. 3 is a cross-sectional view taken on the line 3—3 of Fig. 2;
Fig. 4 is a cross-sectional view taken on the line 4—4 of Fig. 2;
Fig. 5 is a cross-sectional view taken on the line 5—5 of Fig. 2;
Fig. 6 is a cross-sectional view taken on the line 6—6 of Fig. 4;
Fig. 7 is a cross-sectional view taken on the line 7—7 of Fig. 2; and,
Fig. 8 is a cross-sectional view of the valve body (with the valve plug removed.)

Referring to the drawings: 10 designates a valve body having inlet and outlet threaded openings 11, 12, 13 and 14, respectively, for the reception of pipes, these openings communicating with rectangular openings 15, 16, 17 and 18, respectively.

A tapered valve seat 19 is bored longitudinally through the body 10 and is receptive of a rotatable valve plug 20. The valve plug 20 is provided with a central longitudinal chamber 21 having a communicating rectangular lateral inlet opening 22 adjacent the upper end, which is capable of registering with either of the rectangular openings 15 or 16, and with oppositely disposed rectangular lateral outlets or passageways 23 and 24 adjacent the lower end, which are capable of registering with the openings 17 and 18 in the valve body 10. The lower end 25 of the valve plug 20 is threaded and extends beyond the face of the boss 26 of the body 10. A washer 27 and a lock nut 28 are mounted on the threaded end 25 for the purpose of drawing the plug 20 tightly onto its seat 19. A set screw 29 is provided to lock the nut in place in a manner well known to the art. The upper end of the plug 20 extends above the valve body 10 and is provided with a square head 30 adapted to receive a wrench or hand wheel for the purpose of rotating the valve plug 20 to a desired position. The upper end of the plug 20 is tapped at 31 for the reception of a screw plug 32 for the purpose of closing the upper end of the chamber 21.

The interior of the body 10 intermediate the inlet and outlet openings, is provided with an annular groove 33. Communicating with the groove 33 are longitudinal grooves 34 and 35 which extend upwardly from said annular groove and longitudinal grooves 36 and 37 which extend downwardly from said annular groove and terminate in the lateral discharge ports or openings 38 and 39 which are formed in the body 10. These ports extend to the outside of the valve body 10 and thus establish communication between the grooves and the atmosphere.

Suitable markings, as at A and B, are provided on the exterior surface of the body 10 and in conjunction with the arrow C engraved or stamped in the end of the valve plug 20 indicates the position of the inlet opening 22 with respect to the openings 15 and 16 and also the position of outlet openings 23 and 24 with respect to the openings 17 and 18.

In service, assuming that inlet opening 11 is connected to the outside source of water supply, which may be primarily intended for drinking purposes, inlet opening 12 is connected to the mill source of supply, and that the outlet openings are connected to the piping for distributing the water for industrial purposes. Also assuming that the valve plug 20 is in the position shown in Fig. 1, that is the arrow C registers with the marking A, the inlet 22 of the plug 20 is in registry with the opening 15 in the body 10 and the openings 23 and 24 are in registry with the openings 17 and 18, respectively. The valve in this position will allow fluid to enter from the opening 15 in the body 10 through the opening 22 into the valve plug chamber 21 and to pass out through the openings or passageways 23 and 24 to the outlet openings 17 and 18, respectively. Opening 16 in the body 10 will now be closed against the entrance of fluid to the valve plug chamber 21 and should any leakage occur between the valve plug 20 and the body 10 it will enter the longitudinal grooves 34 and 35 and the annular groove 33 and then pass down through the longitudinal grooves 36 and 37 and out through the ports 38 and 39 to the atmosphere. When the valve plug 20 is turned in the opposite direction, so that the arrow C registers with the marking B, fluid will be admitted to the chamber 21 of the valve plug 20 from the opening 16 in the body 10 and the inlet opening 22 in the valve plug and thence out through the outlet openings or passageways as described above, and any leakage between the valve plug 20 and the body 10 will be drained to the atmosphere as previously described. Thus it will be evident that we have devised a valve which will drain to the atmosphere any leakage between the valve plug 20 and the body 10 and in this way prevent any leakage from coming into contact with the fluid passing through the chamber 21 of the valve plug 20.

While we have used a water supply system to illustrate an environment in which our device may be used to advantage, it is manifest that it is adaptable to various systems for conveying any kinds of fluids.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

1. In a valve structure, a hollow body having a valve plug seat, and a plug mounted therein, said body being provided at its interior surface adjacent said plug with a central annular groove and upper and lower longitudinal grooves, said longitudinal grooves communicating with said annular groove, the lower longitudinal grooves terminating at their lower end into ports which open to the outside of said body.

2. In a valve structure, a body having a plurality of inlet and outlet openings therein and provided with a central longitudinal bore, a hollow rotatable valve plug mounted within said bore and having an inlet opening capable of registering with any of the inlet openings in said body and outlet openings capable of registering with said outlet openings in said body, the interior surface of said body adjacent said plug having an annular groove intermediate its inlet openings and the outlet openings, and upper and lower longitudinal grooves communicating with the annular groove, the lower longitudinal grooves terminating in ports which communicate with the atmosphere.

3. In a valve structure, a body having a plurality of inlet and outlet openings therein and provided with a central longitudinal bore, a rotatable plug within said bore having communicating inlet and outlets capable of registering with any of the inlets and the outlets in said body, respectively, the interior of said body having an annular groove intermediate the inlet openings and the outlet openings and upper and lower longitudinal grooves communicating with the annular groove, the lower grooves terminating in ports which communicate with the atmosphere and adapted to drain from the valve any leakage between the valve body and the valve plug.

4. A valve comprising a body, having a plurality of inlet and outlet openings and a bore therein, and a hollow valve plug seated in said bore, said plug having an inlet to its interior capable of communicating with any of the inlet openings of said body and oppositely disposed outlets from its interior to establish communication with the outlet openings of said body, said body having an annular groove formed in the surface of said bore intermediate its inlet and outlet openings communicating with the exterior.

5. A valve structure consisting of a hollow body having oppositely disposed inlet and outlet openings, respectively, the interior surface of said body having an annular groove intermediate the inlet and outlet openings and upper and lower longitudinal grooves communicating with the annular groove, the lower grooves terminating in ports which open to the outside of said body, and a hollow rotatable valve plug mounted within said body, said valve plug having an inlet opening communicating with the interior capable of registering with either of the inlet openings in said body, and outlet openings from the interior capable of registering with the outlet openings in the body, the upper end of said valve plug being adapted to receive means for rotating said plug to bring the inlet thereof into registry with either of the inlet openings in said body.

6. A valve structure comprising a hollow body member having two inlet openings and an outlet opening, and a closure member adapted to close one of said inlet openings and establish communication between the other of said inlet openings and said outlet opening, said structure being provided with a passageway disposed intermediate said inlet openings and communicating with an annular groove intermediate the inlet openings and the outlet opening adapted to communicate the interior of said body member with the exterior thereof.

7. A valve structure comprising a body having a seat, and a plug containing a chamber fitting said seat, said body having two inlet openings and an outlet opening, said plug having an inlet opening to said chamber adapted to selectively register with one or the other of said inlet openings in said body and two outlet openings adapted to selectively register with said outlet opening in said body, said valve structure having a passageway disposed intermediate said inlet openings in the body and an annular groove intermediate the inlet openings and the outlet opening communicating said seat with the exterior of said body.

8. A valve structure comprising a body having an inlet opening adapted to connect with a source of fluid supply and having a second inlet opening adapted to connect with another source of fluid supply and also having an outlet opening, means to selectively communicate either one of said inlet openings with said outlet opening and close the other of said inlet openings, and means intermediate said inlet openings terminating in an annular groove intermediate said inlet openings and the outlet opening adapted to prevent leakage from one of said fluid supplies mixing with the other of said supplies.

In testimony whereof we hereunto affix our signatures.

BENJAMIN W. WINSHIP.
WILLIAM T. HARDER.